United States Patent
Hui et al.

(10) Patent No.: US 10,410,398 B2
(45) Date of Patent: Sep. 10, 2019

(54) SYSTEMS AND METHODS FOR REDUCING MEMORY BANDWIDTH USING LOW QUALITY TILES

(71) Applicant: QUALCOMM Incorporated, San Diego, CA (US)

(72) Inventors: Shiu Wai Hui, Richmond Hill (CA); Veluppillai Arulesan, Toronto (CA); Yida Wang, North York (CA)

(73) Assignee: QUALCOMM Incorporated, San Diego, CA (US)

(*) Notice: Subject to any disclaimer, the term of this patent is extended or adjusted under 35 U.S.C. 154(b) by 289 days.

(21) Appl. No.: 14/628,097

(22) Filed: Feb. 20, 2015

(65) Prior Publication Data

US 2016/0247310 A1  Aug. 25, 2016

(51) Int. Cl.
| | | |
|---|---|---|
| *G06T 15/04* | (2011.01) | |
| *G06T 1/20* | (2006.01) | |
| *G06T 1/60* | (2006.01) | |
| *G06T 3/40* | (2006.01) | |
| *G06T 11/00* | (2006.01) | |
| *G09G 5/393* | (2006.01) | |
| *G06F 16/957* | (2019.01) | |

(52) U.S. Cl.
CPC ......... *G06T 15/04* (2013.01); *G06F 16/9577* (2019.01); *G06T 1/20* (2013.01); *G06T 1/60* (2013.01); *G06T 3/4092* (2013.01); *G06T 11/001* (2013.01); *G09G 5/393* (2013.01); *G06T 2215/12* (2013.01); *G09G 2340/0407* (2013.01); *G09G 2350/00* (2013.01); *G09G 2360/122* (2013.01); *G09G 2370/027* (2013.01)

(58) Field of Classification Search
CPC .. G06T 15/04; G06T 1/20; G06T 1/60; G06T 3/4092; G06T 11/001; G06T 5/001; G06T 3/4076; G06F 17/30905; G06F 16/9577; G06F 16/958; G09G 5/393; G09G 2340/0407; G09G 2340/0457; G09G 2340/12; G09G 5/395; G09G 5/397; G09G 5/399; G09G 5/39; G09G 2370/027; G09G 2360/122
See application file for complete search history.

(56) References Cited

U.S. PATENT DOCUMENTS 5,289,205 A * 2/1994 Torres ................. G06F 3/04855
345/685
5,696,531 A * 12/1997 Suzuki .................. G06T 3/0018
345/698

(Continued)

OTHER PUBLICATIONS

International Search Report and Written Opinion—PCT/US2016/017027—ISA/EPO—dated May 4, 2016.

*Primary Examiner* — Devona E Faulk
*Assistant Examiner* — Charles L Beard
(74) *Attorney, Agent, or Firm* — Haynes and Boone, LLP

(57) ABSTRACT

Systems and methods are disclosed for displaying data on a display device. An example method of displaying data on a display device includes computing a texture based on a difference between a high quality (HQ) tile and a corresponding low quality (LQ) tile. The method also includes storing the texture into an alpha channel of the LQ tile. The method further includes compositing the LQ tile onto the display device when an attribute of the alpha channel satisfies a threshold.

20 Claims, 4 Drawing Sheets

(56) References Cited

U.S. PATENT DOCUMENTS

| | | | | |
|---|---|---|---|---|
| 5,702,868 A * | 12/1997 | Kellam | ............... | G03F 7/2022 257/E21.026 |
| 5,933,137 A * | 8/1999 | Anderson | ......... | G06F 17/30274 358/909.1 |
| 6,166,712 A * | 12/2000 | Hoffman | ............... | G09G 3/004 345/684 |
| 6,167,442 A * | 12/2000 | Sutherland | ............ | G06F 16/51 709/217 |
| 6,184,888 B1 * | 2/2001 | Yuasa | .................. | A61J 7/0481 345/419 |
| 6,191,793 B1 * | 2/2001 | Piazza | .................. | G06T 15/04 345/582 |
| 6,198,847 B1 * | 3/2001 | Washizawa | ............ | G06K 9/209 382/181 |
| 6,236,703 B1 * | 5/2001 | Riley | ................... | H03L 7/1976 331/1 A |
| 6,252,989 B1 * | 6/2001 | Geisler | ............... | H04N 19/176 345/555 |
| 6,278,447 B1 * | 8/2001 | Anderson | ......... | G06F 17/30277 348/E5.047 |
| 6,396,503 B1 * | 5/2002 | Goss | ..................... | G06T 15/04 345/422 |
| 6,515,675 B1 * | 2/2003 | Bourdev | ............... | G06T 15/503 345/592 |
| 6,522,336 B1 * | 2/2003 | Yuasa | .................. | A61J 7/0481 345/419 |
| 6,591,020 B1 * | 7/2003 | Klassen | ............... | G06T 11/001 382/173 |
| 6,658,080 B1 * | 12/2003 | Poole | ................... | A61B 5/7445 378/4 |
| 6,728,217 B1 * | 4/2004 | Amirijoo | ............. | H04L 1/0002 370/252 |
| 6,904,176 B1 * | 6/2005 | Chui | ..................... | H04N 19/63 375/E7.04 |
| 7,477,793 B1 * | 1/2009 | Boliek | .................. | H04N 19/70 382/240 |
| 7,761,806 B2 * | 7/2010 | Kim | ...................... | G06F 3/0485 345/173 |
| 7,801,220 B2 * | 9/2010 | Zhang | ................. | H04N 19/105 375/240 |
| 7,965,902 B1 * | 6/2011 | Zelinka | ................ | G06T 17/05 382/284 |
| 7,991,837 B1 * | 8/2011 | Tahan | .................. | G06F 3/0481 348/240.3 |
| 8,019,597 B2 * | 9/2011 | Oshikiri | ................ | G10L 19/24 704/200 |
| 8,081,821 B1 * | 12/2011 | Schaem | ................... | H04N 9/75 382/173 |
| 8,260,006 B1 * | 9/2012 | Callari | ................ | G06K 9/00973 345/619 |
| 8,307,305 B2 * | 11/2012 | Duhig | ................... | G06F 3/0482 715/716 |
| 8,339,470 B2 * | 12/2012 | Narayanan | ............ | H04N 5/345 348/218.1 |
| 8,396,325 B1 * | 3/2013 | Kwatra | .................... | G06T 7/33 382/284 |
| 8,397,180 B2 * | 3/2013 | Duhig | ................... | G06F 3/0482 345/173 |
| 8,648,858 B1 * | 2/2014 | Swenson | .................. | G06T 9/00 345/428 |
| 8,682,110 B2 * | 3/2014 | Shin | ..................... | H04N 7/0117 362/236 |
| 8,701,028 B2 * | 4/2014 | Kokemohr | ......... | G06F 3/04845 715/768 |
| 8,706,802 B1 * | 4/2014 | Dayan | .................. | G06F 16/9577 709/203 |
| 8,766,984 B2 * | 7/2014 | Mark | .................... | G06F 3/0485 345/428 |
| 8,797,365 B2 * | 8/2014 | Imai | ........................ | G09G 5/34 345/672 |
| 8,856,684 B2 * | 10/2014 | Duhig | ................... | G06F 3/0482 715/830 |
| 8,891,010 B1 * | 11/2014 | Woodall | ......... | H04N 21/440263 348/445 |
| 8,917,344 B2 * | 12/2014 | Shiohara | ............... | H04N 1/0044 348/222.1 |
| 8,928,694 B2 * | 1/2015 | Inada | ..................... | G06T 11/60 345/501 |
| 8,934,542 B2 * | 1/2015 | Wiegand | ................ | H04N 19/30 375/240.12 |
| 9,035,973 B2 * | 5/2015 | Matsuki | ................ | G03G 15/502 345/684 |
| 9,208,403 B1 * | 12/2015 | Aviv | .................... | G06K 9/6212 |
| 9,215,468 B1 * | 12/2015 | Faroudja | ............... | H04N 19/172 |
| 9,218,689 B1 * | 12/2015 | Baldwin | ................ | G06T 17/10 |
| 9,230,393 B1 * | 1/2016 | Davies | ................. | G07F 17/3209 |
| 9,367,641 B2 * | 6/2016 | Kwan | .................... | G06F 16/957 |
| 9,384,503 B2 * | 7/2016 | Kazama | ............ | G06Q 30/0277 |
| 9,626,605 B2 * | 4/2017 | Ozawa | ................. | G06K 15/1822 |
| 9,704,270 B1 * | 7/2017 | Main | ......................... | G06T 9/00 |
| 9,710,887 B1 * | 7/2017 | Sahlsten | ................ | G03B 21/142 |
| 9,904,665 B2 * | 2/2018 | Hui | ...................... | G06F 17/2247 |
| 9,947,089 B2 * | 4/2018 | Motomura | ........... | G02B 21/367 |
| 10,140,268 B2 * | 11/2018 | Hui | ........................... | G06T 1/20 |
| 2001/0033303 A1 | 10/2001 | Anderson | .......... | G06F 17/30277 715/854 |
| 2002/0001682 A1 * | 1/2002 | Baker-Salmon | .......... | B44C 1/26 428/13 |
| 2002/0015042 A1 * | 2/2002 | Robotham | ................ | G06F 3/14 345/581 |
| 2002/0091738 A1 * | 7/2002 | Rohrabaugh | ....... | H04L 67/2823 715/249 |
| 2002/0180734 A1 * | 12/2002 | Endoh | ................. | G06F 3/04815 345/428 |
| 2003/0030646 A1 * | 2/2003 | Yeh | ......................... | G06T 15/04 345/582 |
| 2003/0095135 A1 * | 5/2003 | Kaasila | ................ | G06F 3/0481 345/613 |
| 2003/0174110 A1 * | 9/2003 | Baba | ..................... | G09G 3/3611 345/88 |
| 2003/0193681 A1 * | 10/2003 | Kumar | ................... | G06K 15/02 358/1.13 |
| 2004/0114813 A1 * | 6/2004 | Boliek | ............... | G06K 9/00463 382/233 |
| 2004/0114814 A1 * | 6/2004 | Boliek | ............... | G06K 9/00463 382/233 |
| 2004/0145599 A1 * | 7/2004 | Taoka | ...................... | G09G 3/20 345/698 |
| 2004/0215659 A1 * | 10/2004 | Singfield | ................. | G06F 16/58 |
| 2005/0206658 A1 * | 9/2005 | Fagans | ................. | G06F 3/0481 345/660 |
| 2005/0210399 A1 * | 9/2005 | Filner | .................. | G06F 16/9577 715/767 |
| 2005/0213125 A1 | 9/2005 | Smith et al. | | |
| 2005/0219275 A1 * | 10/2005 | Kitaura | ................. | G09G 3/2092 345/690 |
| 2005/0270311 A1 * | 12/2005 | Rasmussen | ............ | G01C 21/32 345/677 |
| 2006/0103663 A1 * | 5/2006 | Collodi | ................ | G06T 11/001 345/611 |
| 2006/0103665 A1 * | 5/2006 | Opala | ....................... | G06F 3/14 345/619 |
| 2006/0107204 A1 * | 5/2006 | Epstein | ................ | G06F 17/212 715/243 |
| 2006/0127880 A1 * | 6/2006 | Harris | ................. | G06K 9/00127 435/4 |
| 2006/0156254 A1 * | 7/2006 | Satake | ........................ | G09G 5/00 715/838 |
| 2006/0164438 A1 * | 7/2006 | Kuno | ........................ | G09G 5/14 345/629 |
| 2006/0176312 A1 * | 8/2006 | Kuno | ........................ | G09G 5/14 345/589 |
| 2006/0256387 A1 * | 11/2006 | Cresens | ................ | G06T 3/4084 358/3.26 |
| 2007/0019869 A1 * | 1/2007 | Strom | ..................... | G06L 9/008 382/233 |
| 2007/0024879 A1 * | 2/2007 | Hamilton, Jr. | ......... | H04N 9/045 358/1.9 |

(56) References Cited

U.S. PATENT DOCUMENTS

| | | | | |
|---|---|---|---|---|
| 2007/0030359 A1* | 2/2007 | Ito | G09G 5/346 | 348/231.2 |
| 2007/0071362 A1* | 3/2007 | Milanfar | G06K 9/20 | 382/299 |
| 2007/0160153 A1* | 7/2007 | Sullivan | G06T 3/4007 | 375/240.29 |
| 2007/0160300 A1* | 7/2007 | Van Vugt | H04N 19/169 | 382/240 |
| 2007/0245119 A1* | 10/2007 | Hoppe | G06F 17/30262 | 711/216 |
| 2007/0268533 A1* | 11/2007 | Kijima | H04N 5/335 | 358/512 |
| 2008/0019601 A1* | 1/2008 | Amagai | H04N 9/646 | 382/254 |
| 2008/0024389 A1* | 1/2008 | O'Brien-Strain | H04N 9/3194 | 345/1.2 |
| 2008/0024683 A1* | 1/2008 | Damera-Venkata | H04N 9/3147 | 348/744 |
| 2008/0030527 A1* | 2/2008 | Namie | G06T 3/4023 | 345/698 |
| 2008/0043209 A1* | 2/2008 | Widdowson | G03B 21/26 | 353/94 |
| 2008/0050031 A1* | 2/2008 | Itoh | G06L 5/50 | 382/260 |
| 2008/0069458 A1* | 3/2008 | Vega-Higuera | G06T 15/08 | 382/232 |
| 2008/0095363 A1* | 4/2008 | DiCarto | H04N 9/3179 | 380/203 |
| 2008/0123997 A1* | 5/2008 | Adams | G06T 3/4015 | 382/299 |
| 2008/0175519 A1* | 7/2008 | Nagumo | G06T 3/4076 | 382/299 |
| 2008/0181498 A1* | 7/2008 | Swenson | G09G 5/14 | 382/173 |
| 2008/0199091 A1* | 8/2008 | Srinivasan | H04N 19/176 | 382/239 |
| 2008/0267525 A1* | 10/2008 | Dai | G06T 3/403 | 382/266 |
| 2008/0273784 A1* | 11/2008 | Pfister | G06T 5/50 | 382/131 |
| 2008/0278522 A1* | 11/2008 | Furihata | G09G 3/2003 | 345/694 |
| 2008/0320396 A1* | 12/2008 | Mizrachi | G06F 3/0485 | 715/744 |
| 2009/0033792 A1* | 2/2009 | Kano | H04N 5/145 | 348/441 |
| 2009/0040386 A1* | 2/2009 | Ishiga | G06T 5/10 | 348/607 |
| 2009/0070711 A1* | 3/2009 | Kwak | G06F 3/0485 | 715/829 |
| 2009/0074328 A1* | 3/2009 | Matsumoto | G06T 3/4007 | 382/300 |
| 2009/0122349 A1* | 5/2009 | Bala | H04N 1/32256 | 358/3.28 |
| 2009/0129643 A1* | 5/2009 | Natanzon | G06F 19/321 | 382/128 |
| 2009/0141809 A1* | 6/2009 | Visharam | H04N 19/61 | 375/240.25 |
| 2009/0148620 A1* | 6/2009 | Petermann | B41F 23/0466 | 427/511 |
| 2009/0161183 A1* | 6/2009 | Schweid | G06T 11/001 | 358/518 |
| 2009/0167870 A1* | 7/2009 | Caleca | H04N 1/00132 | 348/207.1 |
| 2009/0167909 A1* | 7/2009 | Imagawa | G06L 3/4053 | 348/262 |
| 2009/0179999 A1* | 7/2009 | Albu | G06T 3/4053 | 348/222.1 |
| 2009/0189900 A1* | 7/2009 | Furukawa | G06T 3/4069 | 345/428 |
| 2009/0207458 A1* | 8/2009 | Doggett, III | H04N 1/54 | 358/3.29 |
| 2009/0263044 A1* | 10/2009 | Imagawa | G06L 3/0087 | 382/275 |
| 2009/0289913 A1* | 11/2009 | Chang | G06F 3/0485 | 345/173 |
| 2009/0309892 A1* | 12/2009 | Uehori | G09G 5/346 | 345/581 |
| 2010/0008418 A1* | 1/2010 | Wu | H04N 19/186 | 375/240.12 |
| 2010/0026825 A1* | 2/2010 | Doida | G06T 3/40 | 348/222.1 |
| 2010/0027619 A1* | 2/2010 | Doser | H04N 19/46 | 375/240.02 |
| 2010/0046612 A1* | 2/2010 | Sun | H04N 19/149 | 375/240.02 |
| 2010/0046842 A1 | 2/2010 | Conwell | | |
| 2010/0119176 A1* | 5/2010 | Ichihashi | G06T 3/403 | 382/300 |
| 2010/0125792 A1* | 5/2010 | Fujiwara | H04N 1/00458 | 715/716 |
| 2010/0166058 A1* | 7/2010 | Perlman | A63F 13/12 | 375/240.02 |
| 2010/0172411 A1* | 7/2010 | Efremov | H04N 19/136 | 375/240.02 |
| 2010/0182478 A1* | 7/2010 | Sawada | H04N 9/045 | 348/311 |
| 2010/0220789 A1* | 9/2010 | Yuwen | H04N 19/61 | 375/240.16 |
| 2010/0225984 A1* | 9/2010 | Niina | H04N 1/40062 | 358/538 |
| 2010/0226593 A1* | 9/2010 | Gerhard | G06F 16/51 | 382/299 |
| 2010/0238350 A1* | 9/2010 | Radhakrishnan | G06F 17/30799 | 348/571 |
| 2010/0260260 A1* | 10/2010 | Wiegand | H04N 19/30 | 375/240.12 |
| 2010/0260412 A1* | 10/2010 | Yamazaki | H04N 1/56 | 382/164 |
| 2010/0290529 A1* | 11/2010 | Topiwala | G06T 3/4069 | 375/240.16 |
| 2010/0295853 A1* | 11/2010 | Diamand | G06T 15/405 | 345/426 |
| 2010/0331041 A1* | 12/2010 | Liao | H04M 1/72555 | 455/556.1 |
| 2011/0019088 A1* | 1/2011 | Kase | H04N 5/44513 | 348/468 |
| 2011/0025720 A1* | 2/2011 | Jo | G06F 3/0485 | 345/684 |
| 2011/0026761 A1* | 2/2011 | Radhakrishnan | G06F 17/30799 | 382/100 |
| 2011/0032419 A1* | 2/2011 | Sakaniwa | H04N 7/0132 | 348/452 |
| 2011/0115813 A1* | 5/2011 | Yamakura | G06T 11/00 | 345/611 |
| 2011/0141224 A1* | 6/2011 | Stec | G06T 1/00 | 348/36 |
| 2011/0164580 A1* | 7/2011 | Keon | H04W 60/00 | 370/329 |
| 2011/0199542 A1* | 8/2011 | Hirai | H04N 5/217 | 348/624 |
| 2011/0210960 A1* | 9/2011 | Touma | G06T 9/00 | 345/419 |
| 2011/0216981 A1* | 9/2011 | Hiraga | H04N 19/176 | 382/233 |
| 2011/0254845 A1* | 10/2011 | Oikawa | G06T 7/12 | 345/427 |
| 2011/0274368 A1* | 11/2011 | Kondo | G06T 3/4053 | 382/264 |
| 2011/0286526 A1* | 11/2011 | Nakagami | H04N 19/593 | 375/240.16 |
| 2012/0002082 A1* | 1/2012 | Johnson | G06T 5/50 | 348/234 |

(56) References Cited

U.S. PATENT DOCUMENTS

| | | | |
|---|---|---|---|
| 2012/0062593 A1* | 3/2012 | Kojima | G06F 3/0488 345/629 |
| 2012/0062957 A1* | 3/2012 | Safonov | G06F 3/1219 358/3.01 |
| 2012/0069020 A1* | 3/2012 | Smith-Casem | G06T 15/08 345/426 |
| 2012/0099153 A1* | 4/2012 | Aoki | G06F 3/1204 358/1.15 |
| 2012/0105673 A1* | 5/2012 | Morales | H04N 5/2355 348/229.1 |
| 2012/0105681 A1* | 5/2012 | Morales | G06T 5/50 348/239 |
| 2012/0139952 A1* | 6/2012 | Imai | G09G 5/34 345/672 |
| 2012/0154420 A1* | 6/2012 | Calandrino | G09G 5/02 345/589 |
| 2012/0206470 A1* | 8/2012 | Frank | H04N 1/4078 345/581 |
| 2012/0219229 A1* | 8/2012 | Springer | G06T 5/003 382/199 |
| 2012/0268465 A1* | 10/2012 | Inada | G06T 11/00 345/428 |
| 2012/0268655 A1* | 10/2012 | MacInnis | G06F 17/30905 348/584 |
| 2012/0287147 A1* | 11/2012 | Brown Elliott | G09G 5/02 345/593 |
| 2012/0287148 A1* | 11/2012 | Brown Elliott | G09G 5/02 345/593 |
| 2012/0287168 A1* | 11/2012 | Botzas | G09G 3/3413 345/690 |
| 2012/0287995 A1* | 11/2012 | Budagavi | H04N 19/11 375/240.12 |
| 2012/0294512 A1* | 11/2012 | Matsuda | G06T 3/4053 382/155 |
| 2012/0300122 A1* | 11/2012 | Liu | H04N 7/0137 348/441 |
| 2012/0313960 A1* | 12/2012 | Segawa | G06T 15/04 345/589 |
| 2012/0314975 A1* | 12/2012 | Shin | H04N 7/0117 382/299 |
| 2013/0011046 A1* | 1/2013 | Choi | G06T 3/4007 382/154 |
| 2013/0016112 A1* | 1/2013 | Burley | G06T 15/04 345/582 |
| 2013/0016920 A1* | 1/2013 | Matsuda | G06T 3/4053 382/299 |
| 2013/0073388 A1* | 3/2013 | Heath | G06Q 50/01 705/14.53 |
| 2013/0120460 A1* | 5/2013 | Adams | G06T 13/80 345/660 |
| 2013/0135347 A1* | 5/2013 | Inada | G09G 5/395 345/629 |
| 2013/0135448 A1* | 5/2013 | Nagumo | H04N 13/0203 348/49 |
| 2013/0169644 A1* | 7/2013 | Bolton | H04Q 9/00 345/440 |
| 2013/0169665 A1* | 7/2013 | Meng | G06T 11/001 345/592 |
| 2013/0181977 A1* | 7/2013 | Tsukagoshi | G09G 5/14 345/419 |
| 2013/0208789 A1* | 8/2013 | Shapira | H04N 5/38 375/240.02 |
| 2013/0215360 A1* | 8/2013 | Pollack | G09G 3/3413 349/61 |
| 2013/0227389 A1* | 8/2013 | Knox | G06Q 30/016 715/234 |
| 2013/0250091 A1* | 9/2013 | Takayama | H04N 7/18 348/80 |
| 2013/0250144 A1* | 9/2013 | Takayama | H04N 5/265 348/239 |
| 2013/0293928 A1* | 11/2013 | Kashibuchi | G06K 15/1881 358/3.06 |
| 2013/0294514 A1* | 11/2013 | Rossato | H04N 19/139 375/240.16 |
| 2013/0308877 A1* | 11/2013 | Tezuka | H04N 1/40068 382/300 |
| 2014/0006129 A1* | 1/2014 | Heath | G06Q 30/0222 705/14.23 |
| 2014/0012831 A1* | 1/2014 | Wallen | G06F 17/30268 707/709 |
| 2014/0072242 A1* | 3/2014 | Wei | H04N 19/176 382/299 |
| 2014/0099036 A1* | 4/2014 | Smith | G06K 9/186 382/218 |
| 2014/0118529 A1* | 5/2014 | Zheng | G21K 7/00 348/80 |
| 2014/0152838 A1* | 6/2014 | Lee | H04N 9/045 348/164 |
| 2014/0176731 A1* | 6/2014 | Geiss | H04N 5/2355 348/207.1 |
| 2014/0177706 A1* | 6/2014 | Fernandes | H04N 19/463 |
| 2014/0189487 A1* | 7/2014 | Kwan | G06F 16/957 715/234 |
| 2014/0192281 A1* | 7/2014 | Smithwick | G02F 1/1313 349/15 |
| 2014/0219547 A1* | 8/2014 | Tuzel | G06T 3/4053 382/154 |
| 2014/0240363 A1* | 8/2014 | Hong | G09G 5/34 345/684 |
| 2014/0267346 A1* | 9/2014 | Ren | G06T 15/04 345/582 |
| 2014/0313211 A1* | 10/2014 | Akenine-Moller | G06T 1/60 345/531 |
| 2014/0313409 A1* | 10/2014 | Schramm | G09G 5/026 348/441 |
| 2014/0328509 A1* | 11/2014 | Guissin | G06T 5/002 382/100 |
| 2014/0353475 A1* | 12/2014 | Meyers | G01J 1/0411 250/216 |
| 2014/0354886 A1* | 12/2014 | Michaeli | H04N 1/4092 348/607 |
| 2015/0016522 A1* | 1/2015 | Sato | H04N 19/30 375/240.12 |
| 2015/0016523 A1* | 1/2015 | Puri | H04N 19/61 375/240.12 |
| 2015/0026566 A1* | 1/2015 | Hui | G06F 16/957 715/240 |
| 2015/0029216 A1* | 1/2015 | Martin | G06K 9/00228 345/626 |
| 2015/0030213 A1* | 1/2015 | Martin | G06K 9/00234 382/118 |
| 2015/0046121 A1* | 2/2015 | Dziura | G01N 21/9501 702/179 |
| 2015/0062175 A1* | 3/2015 | Kim | G09G 3/3648 345/639 |
| 2015/0093015 A1* | 4/2015 | Liang | G06T 3/4076 382/154 |
| 2015/0093045 A1* | 4/2015 | Turkan | G06T 3/4053 382/299 |
| 2015/0098499 A1* | 4/2015 | Tominaga | H04N 5/23229 375/240.02 |
| 2015/0103094 A1* | 4/2015 | Xue | H04N 1/6072 345/596 |
| 2015/0103208 A1* | 4/2015 | Tsuchida | H04N 5/772 348/239 |
| 2015/0123993 A1* | 5/2015 | Ohba | G09G 5/00 345/629 |
| 2015/0160450 A1* | 6/2015 | Ou | G02B 21/002 348/80 |
| 2015/0170386 A1* | 6/2015 | Chawathe | G06T 1/20 345/634 |
| 2015/0170387 A1* | 6/2015 | Chawathe | G06T 11/40 345/635 |
| 2015/0170388 A1* | 6/2015 | Chawathe | G06T 11/60 345/629 |
| 2015/0170616 A1* | 6/2015 | Corpet | G01C 21/32 345/629 |

(56) References Cited

U.S. PATENT DOCUMENTS

| | | | |
|---|---|---|---|
| 2015/0178936 A1* | 6/2015 | Boisson | H04N 13/0271 382/154 |
| 2015/0234316 A1* | 8/2015 | Kanaya | G03G 15/5058 430/30 |
| 2015/0256837 A1* | 9/2015 | Bar-On | H04N 19/63 375/240.02 |
| 2015/0287239 A1* | 10/2015 | Berghoff | G06F 9/48 345/422 |
| 2015/0302612 A1* | 10/2015 | Ishikawa | G06T 11/40 345/590 |
| 2015/0317767 A1* | 11/2015 | Shibata | G06T 3/4053 382/254 |
| 2015/0332435 A1* | 11/2015 | Motohashi | G06T 3/4053 382/171 |
| 2015/0334398 A1* | 11/2015 | Socek | G06T 7/11 375/240.26 |
| 2015/0363634 A1* | 12/2015 | Yin | G06K 9/00221 382/118 |
| 2015/0370952 A1* | 12/2015 | Wang | G06F 17/5072 361/328 |
| 2015/0371123 A1* | 12/2015 | Kodama | G06K 15/1877 358/3.14 |
| 2016/0004695 A1* | 1/2016 | Yang | G06F 17/30247 707/738 |
| 2016/0014411 A1* | 1/2016 | Sychev | H04N 19/56 375/240.12 |
| 2016/0035069 A1* | 2/2016 | Min | G06T 5/007 382/266 |
| 2016/0035133 A1* | 2/2016 | Ye | G06T 19/006 345/419 |
| 2016/0048980 A1* | 2/2016 | Wang | G06T 11/40 345/583 |
| 2016/0063308 A1* | 3/2016 | Pauly | G06K 9/0014 382/128 |
| 2016/0063677 A1* | 3/2016 | Deamo | G06T 3/4053 382/199 |
| 2016/0078600 A1* | 3/2016 | Perez Pellitero | G06T 3/4053 382/155 |
| 2016/0078634 A1* | 3/2016 | Wang | G06K 9/4642 382/171 |
| 2016/0093026 A1* | 3/2016 | Choudhury | G06T 5/00 382/266 |
| 2016/0098589 A1* | 4/2016 | Brieu | G06K 9/4642 382/128 |
| 2016/0110323 A1* | 4/2016 | Hui | G06F 17/2247 715/234 |
| 2016/0124696 A1* | 5/2016 | Hui | G06F 3/14 345/522 |
| 2016/0133046 A1* | 5/2016 | Tokumoto | G06T 11/60 345/592 |
| 2016/0140737 A1* | 5/2016 | Hui | G06T 15/04 345/583 |
| 2016/0171657 A1* | 6/2016 | Matson | G06T 5/003 382/299 |
| 2016/0171658 A1* | 6/2016 | Matson | G06T 3/4053 382/299 |
| 2016/0171715 A1* | 6/2016 | Matson | G06T 3/4053 382/103 |
| 2016/0177875 A1* | 6/2016 | Dutheil | F02K 1/805 60/230 |
| 2016/0180762 A1* | 6/2016 | Bathiche | G06F 3/013 345/174 |
| 2016/0180803 A1* | 6/2016 | Hui | G09G 5/005 715/744 |
| 2016/0182593 A1* | 6/2016 | Denoual | H04L 65/605 709/219 |
| 2016/0205330 A1* | 7/2016 | Rojahn | H04N 5/2224 348/143 |
| 2016/0210911 A1* | 7/2016 | Chen | G09G 3/3607 |
| 2016/0212438 A1* | 7/2016 | Andersson | H04N 19/48 |
| 2016/0247259 A1* | 8/2016 | Toyoda | G06T 3/40 |
| 2016/0321781 A1* | 11/2016 | Mann | H04N 21/85406 |
| 2016/0330493 A1* | 11/2016 | Chuah | G06T 15/04 |
| 2016/0370855 A1* | 12/2016 | Lanier | H04N 5/335 |
| 2016/0371818 A1* | 12/2016 | Su | G06T 5/003 |
| 2017/0018277 A1* | 1/2017 | Wang | G10L 19/06 |
| 2017/0024856 A1* | 1/2017 | Kajimura | G06T 3/40 |
| 2017/0024924 A1* | 1/2017 | Wald | G06T 1/60 |
| 2017/0025098 A1* | 1/2017 | Keramidas | G09G 5/026 |
| 2017/0038589 A1* | 2/2017 | Jepsen | G02B 27/0172 |
| 2017/0054871 A1* | 2/2017 | Prenn | G06K 15/1851 |
| 2017/0061574 A1* | 3/2017 | Hui | G06T 1/20 |
| 2017/0103565 A1* | 4/2017 | Jeong | G06T 15/04 |
| 2017/0110093 A1* | 4/2017 | Stein | G09G 5/30 |
| 2017/0118476 A1* | 4/2017 | Sakamoto | H04N 19/124 |
| 2017/0139213 A1* | 5/2017 | Schmidtlin | G02B 27/0172 |
| 2017/0140506 A1* | 5/2017 | Sato | H04N 7/01 |
| 2017/0148212 A1* | 5/2017 | Goel | G06T 15/04 |
| 2017/0155966 A1* | 6/2017 | Oh | H04N 21/2362 |
| 2017/0163966 A1* | 6/2017 | Barron | H04N 13/271 |
| 2017/0164290 A1* | 6/2017 | Arulesan | G06F 16/957 |
| 2017/0168990 A1* | 6/2017 | Kernert | G06F 17/16 |
| 2017/0169545 A1* | 6/2017 | Turkan | G06T 3/4076 |
| 2017/0213370 A1* | 7/2017 | Lea | G06Q 50/10 |
| 2017/0244908 A1* | 8/2017 | Flack | G06K 9/00234 |
| 2017/0289310 A1* | 10/2017 | Kridlo | H04L 67/06 |
| 2017/0293825 A1* | 10/2017 | Shao | G06K 9/66 |
| 2017/0316597 A1* | 11/2017 | Ceylan | G06T 15/04 |
| 2017/0323028 A1* | 11/2017 | Jonker | G06F 16/9024 |
| 2017/0339391 A1* | 11/2017 | Zhou | H04L 65/604 |
| 2017/0339431 A1* | 11/2017 | Zhang | G06T 3/4053 |
| 2017/0345321 A1* | 11/2017 | Cross | G01C 23/005 |
| 2018/0005561 A1* | 1/2018 | Moon | G09G 3/2003 |
| 2018/0020204 A1* | 1/2018 | Pang | H04N 13/344 |
| 2018/0020223 A1* | 1/2018 | King | H04N 19/17 |
| 2018/0025478 A1* | 1/2018 | Lee | G06T 5/50 382/284 |
| 2018/0054630 A1* | 2/2018 | Chang | H04N 19/91 |
| 2018/0054660 A1* | 2/2018 | Hwang | H04N 21/234 |
| 2018/0084253 A1* | 3/2018 | Thiagarajan | H04N 19/176 |
| 2018/0089091 A1* | 3/2018 | Akenine-Moller | G06T 1/60 |
| 2018/0103259 A1* | 4/2018 | Mann | H04N 21/85406 |
| 2018/0122104 A1* | 5/2018 | Jeong | G06T 11/001 |
| 2018/0129902 A1* | 5/2018 | Li | G06K 9/4671 |
| 2018/0137689 A1* | 5/2018 | Eastwood | G06T 19/20 |
| 2018/0146212 A1* | 5/2018 | Hensler | G06F 3/012 |
| 2018/0160160 A1* | 6/2018 | Swaminathan | H04N 21/2662 |
| 2018/0166043 A1* | 6/2018 | Stein | G09G 5/30 |
| 2018/0174275 A1* | 6/2018 | Bourdev | H04N 19/126 |
| 2018/0182099 A1* | 6/2018 | Lesniak | G06T 5/002 |
| 2018/0199067 A1* | 7/2018 | Kalish | H04N 19/625 |
| 2018/0225807 A1* | 8/2018 | Lee | G06T 3/4076 |
| 2018/0232857 A1* | 8/2018 | Zhao | G06K 9/6215 |
| 2018/0240221 A1* | 8/2018 | Rijnders | G06T 5/10 |
| 2018/0249163 A1* | 8/2018 | Curcio | H04N 19/167 |
| 2018/0275402 A1* | 9/2018 | Popovich | G02B 27/0103 |
| 2018/0295400 A1* | 10/2018 | Thomas | H04N 21/85406 |
| 2018/0302650 A1* | 10/2018 | Kawamura | H04N 19/63 |
| 2018/0316855 A1* | 11/2018 | Ou | G02B 21/084 |
| 2018/0338078 A1* | 11/2018 | Cote | G06T 5/50 |
| 2018/0338138 A1* | 11/2018 | Zeng | G09G 3/32 |
| 2018/0357810 A1* | 12/2018 | Young | G06T 11/40 |
| 2019/0137932 A1* | 5/2019 | Ozcan | G03H 1/0005 |

* cited by examiner

SYSTEMS AND METHODS FOR REDUCING MEMORY BANDWIDTH USING LOW QUALITY TILES

FIELD OF DISCLOSURE

The present disclosure generally relates to computing systems, and more particularly to rendering content in a graphics processing system.

BACKGROUND

Computing devices may be equipped with one or more high-performance graphics processing units (GPUs) providing high performance with regard to computations and graphics rendering. Computing devices may use a GPU to accelerate the rendering of graphics data for display. Examples of such computing devices may include a computer workstation, mobile phones (e.g., smartphones), embedded systems, personal computers, tablet computers, and video game consoles.

Rendering generally refers to the process of converting a three-dimensional (3D) graphics scene, which may include one or more 3D graphics objects, into two-dimensional (2D) rasterized image data. In particular, GPUs may include a 3D rendering pipeline to provide at least partial hardware acceleration for the rendering of a 3D graphics scene. The 3D graphics objects in the scene may be subdivided by a graphics application into one or more 3D graphics primitives (e.g., points, lines, triangles, patches, etc.), and the GPU may convert the 3D graphics primitives of the scene into 2D rasterized image data.

BRIEF SUMMARY

Systems and methods are disclosed for displaying data on a display device using LQ tiles to reduce memory bandwidth. Users may fast scroll webpages with minimal degradation in the display quality or information content of webpages.

According to some embodiments, a method for displaying data on a display device includes computing a texture based on a difference between a high quality (HQ) tile and a corresponding low quality (LQ) tile. The method also includes storing the texture into an alpha channel of the LQ tile. The method further includes compositing the LQ tile onto the screen when an attribute of the alpha channel satisfies a threshold.

According to some embodiments, a system for displaying data on a display device includes a display device and a memory. The system also includes one or more processors coupled to the memory and display device. The one or more processors read the memory and are configured to compute a texture based on a difference between a HQ tile and a corresponding LQ tile. The processors are also configured to store the texture into an alpha channel of the LQ tile. The processors are further configured to composite the LQ tile onto the display device when an attribute of the alpha channel satisfies a threshold.

According to some embodiments, a computer-readable medium has stored thereon computer-executable instructions for performing operations including: computing a texture based on a difference between a HQ tile and a corresponding LQ tile; storing the texture into an alpha channel of the LQ tile; and compositing the LQ tile onto the display device when an attribute of the alpha channel satisfies a threshold.

According to some embodiments, an apparatus for displaying data on a display device includes means for computing a texture based on a difference between a HQ tile and a corresponding LQ tile. The system also includes means for storing the texture into an alpha channel of the LQ tile. The system further includes compositing the LQ tile onto the display device when an attribute of the alpha channel satisfies a threshold.

BRIEF DESCRIPTION OF THE DRAWINGS

The accompanying drawings, which form a part of the specification, illustrate embodiments of the invention and together with the description, further serve to explain the principles of the embodiments. In the drawings, like reference numbers may indicate identical or functionally similar elements. The drawing in which an element first appears is generally indicated by the left-most digit in the corresponding reference number.

Figure 1:
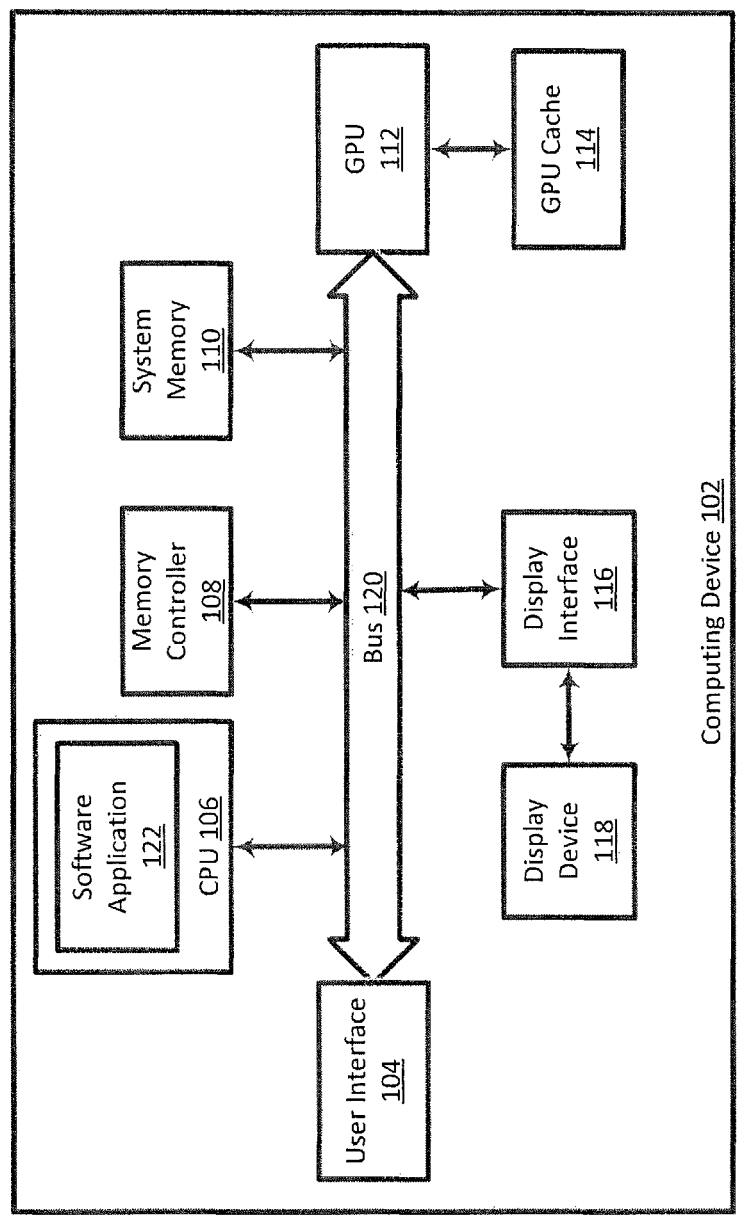
FIG. 1 is a block diagram illustrating a computing device that may be used to implement rendering techniques, according to some embodiments.

Embodiments of the present disclosure and their advantages are best understood by referring to the detailed description that follows.

DETAILED DESCRIPTION

I. Overview
II. Example System Architectures
III. Render Content onto a Display Device
  A. HQ Tile is Unavailable and LQ Tile is Available
  B. HQ Tile and LQ Tile are Available
    1. Compute a Texture "DLOW" Having the Same Resolution as the LQ Tile
    2. Store the Texture "DLOW" into an Alpha Channel of the LQ
    3. Difference Between the LQ and HQ Tiles Based on a Threshold
IV. Example Method I. Overview It is to be understood that the following disclosure provides many different embodiments, or examples, for implementing different features of the present disclosure. Some embodiments may be practiced without some or all of these specific details. Specific examples of components, modules, and arrangements are described below to simplify the present disclosure. These are, of course, merely examples and are not intended to be limiting.

Webpages are full of rich multimedia content that may include graphics, videos, images, text, etc. During webpage rendering, web browsers may partition webpages into tiles. The webpage content inside each tile may be rasterized into a bitmap that is then loaded into a texture for the GPU to access. Each bitmap may correspond to a tile that covers a portion of the screen. To display the webpage, the GPU composites the tiles onto the screen. As a user scrolls the webpage frame, new tiles may appear in the browser window and old tiles may disappear from the browser window.

The GPU may generate tiles having different resolutions. A low quality (LQ) tile is a lower resolution version of a corresponding high quality (HQ) tile. While HQ tiles are tiles that may have the same resolution as the screen, LQ tiles are scaled down versions of the information content overlapped by the LQ tiles. LQ tiles are relatively fast to render compared to fully rendered tiles, referred to as HQ tiles, and may be used for quickly conveying a thumbnail sketch of the webpage content overlapped by the LQ tiles.

During fast scrolling, not all of the HQ tiles of a frame may be rendered before a new frame appears in the browser window. To allow smooth scrolling of webpages in web browsers, a frame rate of about 60 frames per second (FPS) may be desirable. Unfortunately, this frame rate typically requires high memory bandwidth. If the user fast scrolls the webpage frame and HQ tiles of the webpage exposed on the screen have not been rendered yet, the user may see blank areas, which may be distracting and degrade overall user experience. Due to the high cost in rendering HQ tiles, corresponding LQ tiles may be generated and composited onto the screen such that a lower resolution version of the webpage can be displayed during scrolling, thus reducing the occurrence of blanking during scroll. The LQ tiles may be rendered into HQ tiles to fully display the information content.

For high resolution devices, a large amount of memory bandwidth may be required to display the entire webpage. Compositing a HQ tile onto the screen may consume a large amount of memory bandwidth and power as well as degrade performance compared to compositing a corresponding LQ tile. It may be desirable to reduce the memory bandwidth in order to improve performance and reduce power consumption. Conventional techniques that reduce the memory bandwidth include performing hardware texture compression. GPUs can perform hardware texture compression, but this technique may be undesirable because it requires hardware support and may be expensive. Alternatively, software techniques for texture compression can also be used. Software texture compression may be undesirable, however, because of the amount of central processing unit (CPU) processing required.

Techniques of the present disclosure may provide solutions that overcome these disadvantages while enabling web browsers to quickly render frames of webpages with minimal degradation in display quality or information content during fast scrolling of the webpages. Systems and methods are disclosed for GPUs to composite either a HQ tile or its corresponding LQ tile onto a display device. A GPU may composite the LQ tile rather than the corresponding HQ tile (without replacing the LQ tile with the HQ tile) if the LQ and HQ tiles are similar enough to not degrade the user's experience. LQ tiles are smaller and consume less memory space than their corresponding HQ tiles. By compositing the LQ tile rather than the HQ tile, the amount of memory accessed during composition by the GPU is reduced. Thus, using LQ tiles may reduce the memory bandwidth required during tile composition.

In some embodiments, the GPU generates a HQ tile and a corresponding LQ tile and computes a texture based on a difference between the HQ tile and LQ tile. Each pixel in the LQ tile may have three color channels and an alpha channel. The alpha channel typically has an attribute describing the degree of opacity of an object fragment for a given pixel. Rather than store the degree of opacity, the GPU may store the texture into the alpha channel of the LQ tile. By doing so, memory space may be conserved. The texture may include a single scalar value per pixel in the LQ tile. The single scalar value corresponding to a pixel in the LQ tile is the difference between the pixel and a plurality of pixels in the corresponding HQ tile, and may be stored as the value of the attribute of the alpha channel.

The GPU may composite the LQ tile onto the display device when an attribute of the alpha channel satisfies a threshold. In an example, an attribute that is below the threshold satisfies the threshold. Such an attribute may indicate that the LQ and HQ tiles are similar enough to each other such that compositing the LQ tile instead of the HQ tile onto the display device will not degrade the user's experience. Alternatively, the GPU may composite the HQ tile onto the display device when the attribute does not satisfy the threshold. An attribute that is not below the threshold may indicate that the LQ and HQ tiles are not similar enough to each other to composite the LQ tile rather than the HQ tile. Accordingly, the HQ tile should be composited onto the display device instead of the corresponding LQ tile.

II. Example System Architectures

FIG. 1 is a block diagram illustrating a computing device 102 that may be used to implement rendering techniques, according to some embodiments. Computing device 102 may include a personal computer, a desktop computer, a laptop computer, a computer workstation, a video game platform or console, a wireless communication device (e.g., a mobile telephone, a cellular telephone, a satellite telephone, and/or a mobile telephone handset), a handheld device such as a portable video game device or a personal digital assistant (PDA), a personal music player, a video player, a television, a television set-top box, a mainframe computer or any other type of device that processes and/or displays graphical data.

As illustrated in the example of FIG. 1, computing device 102 includes a user interface 104, a CPU 106, a memory controller 108, a system memory 110, a graphics processing unit (GPU) 112, a GPU cache 114, a display interface 116, a display device 118, and bus 120. User interface 104, CPU 106, memory controller 108, GPU 112 and display interface 116 may communicate with each other using bus 120. It should be noted that the specific configuration of buses and communication interfaces between the different components shown in FIG. 1 is merely an example, and other configurations of computing devices and/or other graphics processing systems with the same or different components may be used to implement the techniques of this disclosure.

CPU 106 may include a general-purpose or a special-purpose processor that controls operation of computing device 102. A user may provide input to computing device 102 to cause CPU 106 to execute one or more software applications. The software applications that execute on CPU 106 may include, for example, an operating system, a software application 122 (e.g., a word processor application, an email application, a spread sheet application, a media player application, a video game application, a graphical user interface (GUI) application, or a browser), or another program. The user may provide input to computing device 102 via one or more input devices (not shown) such as a keyboard, a mouse, a microphone, a touch pad or another input device that is coupled to computing device 102 via user interface 104.

Software application 122 may include one or more graphics rendering instructions that instruct GPU 112 to render graphics data to display device 118. In some examples, the software instructions may conform to a graphics application programming interface (API), such as an Open Graphics Library (OpenGL®) API, an Open Graphics Library Embedded Systems (OpenGL ES) API, a Direct3D API, an X3D API, a RenderMan API, a WebGL API, or any other public or proprietary standard graphics API. To process the graphics rendering instructions, CPU 106 may issue one or more graphics rendering commands to GPU 112 to cause it to render all or some of the graphics data. The graphics data to be rendered may include a list of graphics primitives, e.g., points, lines, triangles, quadrilaterals, triangle strips, etc.

Memory controller 108 facilitates the transfer of data going into and out of system memory 110. For example, memory controller 108 may receive memory read and write commands, and service such commands with respect to memory system 110 in order to provide memory services for the components in computing device 102. Memory controller 108 is communicatively coupled to system memory 110. Although memory controller 108 is illustrated in the example computing device 102 of FIG. 1 as being a processing module that is separate from both CPU 106 and system memory 110, in other examples, some or all of the functionality of memory controller 108 may be implemented on one or both of CPU 106 and system memory 110.

System memory 110 may store program modules and/or instructions that are accessible for execution by CPU 106 and/or data for use by the programs executing on CPU 106. For example, system memory 110 may store user applications and graphics data associated with the applications. System memory 110 may additionally store information for use by and/or generated by other components of computing device 102. For example, system memory 110 may act as a device memory for GPU 112 and may store data to be operated on by GPU 112 as well as data resulting from operations performed by GPU 112. For example, system memory 110 may store any combination of texture buffers, depth buffers, stencil buffers, vertex buffers, frame buffers, or the like. In addition, system memory 110 may store command streams for processing by GPU 112. System memory 110 may include one or more volatile or non-volatile memories or storage devices, such as, for example, random access memory (RAM), static RAM (SRAM), dynamic RAM (DRAM), read-only memory (ROM), erasable programmable ROM (EPROM), electrically erasable programmable ROM (EEPROM), Flash memory, a magnetic data media or an optical storage media.

GPU 112 may be configured to perform graphics operations to render one or more graphics primitives to display device 118 and to texture map an image to a pixel for display. When software application 122 executing on CPU 106 requires graphics processing, CPU 106 may provide graphics commands and graphics data to GPU 112 for rendering to display device 118. The graphics commands may include draw call commands, GPU state programming commands, memory transfer commands, general-purpose computing commands, kernel execution commands, etc. In some examples, CPU 106 may provide the commands and graphics data to GPU 112 by writing the commands and graphics data to system memory 110, which may be accessed by GPU 112. In an example, graphics data may include a texture that is stored in system memory 110 and used by GPU 112 to determine the color for a pixel on display device 118. In some examples, GPU 112 may be further configured to perform general-purpose computing for applications executing on CPU 106.

GPU 112 may, in some instances, be built with a highly-parallel structure that provides more efficient processing of vector operations than CPU 106. For example, GPU 112 may include a plurality of processing units that are configured to operate on multiple vertices, control points, pixels and/or other data in a parallel manner. The highly parallel nature of GPU 112 may, in some instances, allow GPU 112 to render graphics images (e.g., GUIs and two-dimensional (2D) and/or three-dimensional (3D) graphics scenes) onto display device 118 more quickly than rendering the images using CPU 106. In addition, the highly parallel nature of GPU 112 may allow it to process certain types of vector and matrix operations for general-purposed computing applications more quickly than CPU 106.

GPU 112 may, in some instances, be integrated into a motherboard of computing device 102. In other instances, GPU 112 may be present on a graphics card that is installed in a port in the motherboard of computing device 102 or may be otherwise incorporated within a peripheral device configured to interoperate with computing device 102. In further instances, GPU 112 may be located on the same microchip as CPU 106 forming a system on a chip (SoC). GPU 112 may include one or more processors, such as one or more microprocessors, application specific integrated circuits (ASICs), field programmable gate arrays (FPGAs), digital signal processors (DSPs), or other equivalent integrated or discrete logic circuitry.

GPU 112 may be directly coupled to GPU cache 114. Thus, GPU 112 may read data from and write data to GPU cache 114 without necessarily using bus 120. In other words, GPU 112 may process data locally using a local storage, instead of off-chip memory. This allows GPU 112 to operate in a more efficient manner by reducing the need of GPU 112 to read and write data via bus 120, which may experience heavy bus traffic. GPU cache 114 may include one or more volatile or non-volatile memories or storage devices, such as, e.g., random access memory (RAM), static RAM (SRAM), dynamic RAM (DRAM), etc. In some instances, however, GPU 112 may not include a separate cache, but instead use system memory 110 via bus 120.

CPU 106 and/or GPU 112 may store rendered image data in a frame buffer that is allocated within system memory 110. The software application that executes on CPU 106 may store the image data (e.g., texel colors, width, height, and color depth) in system memory 110 Display interface 116 may retrieve the data from the frame buffer and configure display device 118 to display the image represented by the rendered image data. In some examples, display interface 116 may include a digital-to-analog converter (DAC) that is configured to convert the digital values retrieved from the frame buffer into an analog signal consumable by display device 118. In other examples, display interface 116 may pass the digital values directly to display device 118 for processing.

Display device 118 may include a monitor, a television, a projection device, a liquid crystal display (LCD), a plasma display panel, a light emitting diode (LED) array, a cathode ray tube (CRT) display, a surface-conduction electron-emitted display (SED), a laser television display, a nanocrystal display or another type of display unit. Display device 118 may be integrated within computing device 102. For instance, display device 118 may be a screen of a mobile telephone handset or a tablet computer. Alternatively, display device 118 may be a stand-alone device coupled to computer device 102 via a wired or wireless communications link. For instance, display device 118 may be a computer monitor or flat panel display connected to a personal computer via a cable or wireless link.

Bus 120 may be implemented using any combination of bus structures and bus protocols including first, second, and third generation bus structures and protocols, shared bus structures and protocols, point-to-point bus structures and protocols, unidirectional bus structures and protocols, and bidirectional bus structures and protocols. Examples of different bus structures and protocols that may be used to implement bus 120 include, e.g., a HyperTransport bus, an InfiniBand bus, an Advanced Graphics Port bus, a Peripheral Component Interconnect (PCI) bus, a PCI Express bus, an Advanced Microcontroller Bus Architecture (AMBA), an Advanced High-performance Bus (AHB), an AMBA Advanced Peripheral Bus (APB), and an AMBA Advanced eXentisible Interface (AXI) bus. Other types of bus structures and protocols may also be used.

Figure 2:
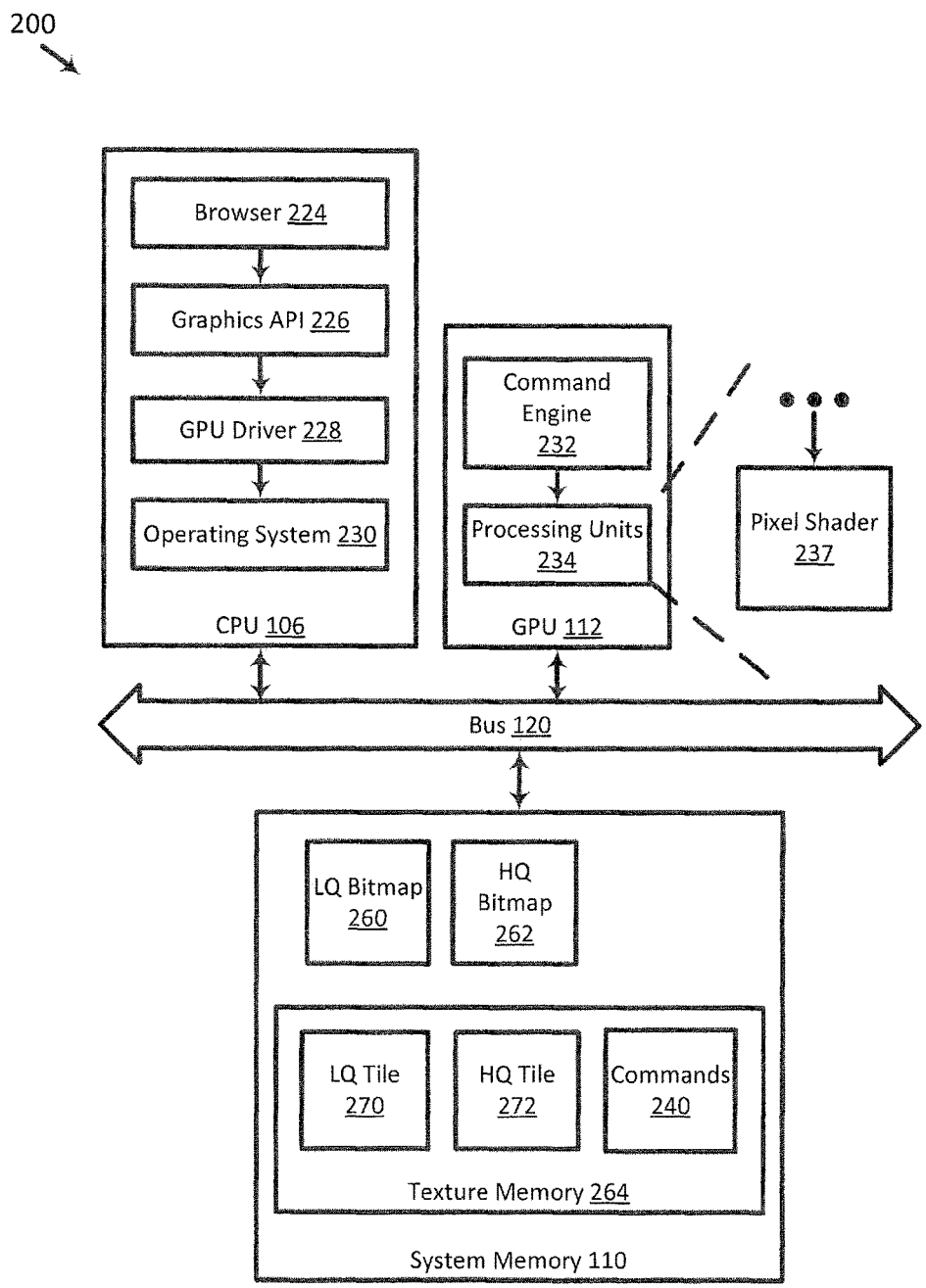
FIG. 2 is a block diagram illustrating a CPU, GPU, and system memory of the computing device in FIG. 1 in further detail, according to some embodiments.

FIG. 2 is a block diagram illustrating CPU 106, GPU 112, and system memory 110 of computing device 102 in FIG. 1 in further detail, according to some embodiments. As shown in FIG. 2, CPU 106 is communicatively coupled to GPU 112 and system memory 110, and GPU 112 is communicatively coupled to CPU 106 and system memory 110. GPU 112 may, in some examples, be integrated onto a motherboard with CPU 106.

CPU 106 is configured to execute a software application such as a browser 224, a graphics API 226, a GPU driver 228, and an operating system 230. Browser 224 may include one or more instructions that cause graphics images to be displayed and/or one or more instructions that cause a non-graphics task (e.g., a general-purposed computing task) to be performed by GPU 112. Browser 224 may include or implement a plurality of hardware components and/or software components that operate to perform various methodologies in accordance with the described embodiments.

A user may point browser 224 to a uniform resource locator (URL) of a webpage. Browser 224 may load a hypertext markup language (HTML) file referenced by the URL and render the webpage on the screen (e.g., display device 118 in FIG. 1). Although browser 224 may be described as issuing instructions to GPU 112, it should be understood that any software application executable in computing device 102 and that processes and/or displays graphical data may be used to issue the instructions. Additionally, although a webpage is described as being the renderable content, this is not intended to be limiting and the renderable/rendered content may be any text, image, or graphics on a page (that is or is not associated with a network such as the Internet).

Figure 3:
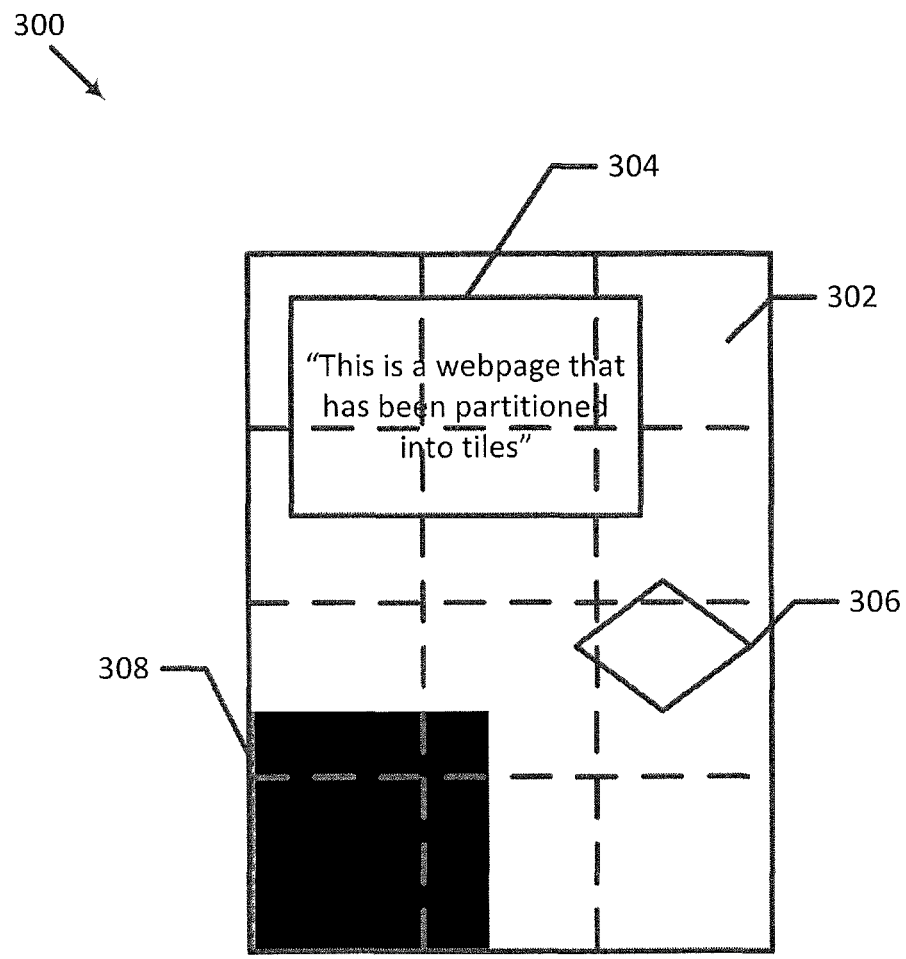
FIG. 3 is an illustration of a webpage rendered by a browser, according to some embodiments.

FIG. 3 is an illustration of a webpage 300 rendered by browser 224, according to some embodiments. FIGS. 2 and 3 will be discussed together to better explain rendering techniques of the present disclosure. Browser 224 may display a frame of webpage 300 in a browser window.

During webpage rendering, browser 224 partitions webpage 300 into a plurality of tiles 302. Webpage 300 is divided into tiles 302 of three columns and four rows for a total of 12 tiles. Tiles 302 may overlap with graphics, text 304, images 306 and 308, icons, links for videos etc. that convey information. Browser 224 rasterizes the webpage content inside each tile into a bitmap. Each bitmap corresponds to a tile that covers a portion of display device 118.

Browser 224 may rasterize one or more versions of one or more tiles of plurality of tiles 302. In an example, browser 224 rasterizes a LQ version and a HQ version of each tile. Browser 224 may rasterize a LQ version of tile 302 into an LQ bitmap 260, and rasterize a corresponding HQ version of tile 302 into an HQ bitmap 262. Browser 224 may rasterize the LQ version of the tile into smaller tiles than the HQ version of the tile. It may take CPU 106 less time to rasterize the content in the LQ version of tile 302 because it is smaller and contains less information than the corresponding HQ tile. As such, in some embodiments, browser 224 generates LQ bitmap 260 before HQ bitmap 262. HQ bitmap 262 may be generated in the background while LQ bitmap 260 is being generated or after LQ bitmap 260 has been generated.

The bitmaps may be inaccessible to GPU 112. To provide GPU 112 with access to the bitmaps, browser 224 may upload them into texture memory 264. In an example, browser 224 uploads LQ bitmap 260 into an LQ tile 270, and uploads HQ bitmap 262 into an HQ tile 272. LQ tile 270 corresponds to HQ tile 272 and is a lower resolution version of HQ tile 272. In an example, HQ tile 272 may map to a 512×512 texel region of display device 118, and corresponding LQ tile 270 may map to a 32×32 texel region of display device 118. A texel region includes one or more texels, and a texel is a pixel in texture memory 264.

Due to the high cost in rasterizing and compositing HQ tiles, their corresponding LQ tiles may be used to render a lower resolution version of webpage 300 during scrolling, thus reducing the occurrence of blanking during scroll as well as the memory bandwidth. Although one LQ bitmap and HQ bitmap is illustrated in FIG. 2, it should be understood that one or more LQ bitmaps and/or one or more HQ bitmaps may be stored in system memory 110. Similarly, although one LQ tile and HQ tile is illustrated in FIG. 2, it should be understood that one or more LQ tiles and/or one or more HQ tiles may be stored in system memory 110. Additionally, a HQ tile may be described as having one corresponding lower resolution version. This is not intended to be limiting, and it should be understood that a HQ tile may have more than one corresponding lower resolution versions.

Browser 224 may issue instructions to graphics API 226, which may translate the instructions received from browser 224 into a format that is consumable by GPU driver 228. GPU driver 228 receives the instructions from browser 224, via graphics API 226, and controls the operation of GPU 112 to service the instructions. For example, GPU driver 228 may formulate one or more commands 240, place the commands 240 into system memory 110 (e.g., in texture memory 264), and instruct GPU 112 to execute commands 240. In some examples, GPU driver 228 may place commands 240 into system memory 110 and communicate with GPU 112 via operating system 230, e.g., via one or more system calls.

System memory 110 may store one or more commands 240. Commands 240 may be stored in one or more command buffers (e.g., a ring buffer) and include one or more state commands and/or one or more draw call commands. A state command may instruct GPU 112 to change one or more of the state variables in GPU 112, such as the draw color. A draw call command may instruct GPU 112 to render a geometry defined by a group of one or more vertices (e.g., defined in a vertex buffer) stored in system memory 110 or to draw content of a texture (e.g., LQ tile 270 or HQ tile 272) onto display device 118.

GPU 112 includes a command engine 232 and one or more processing units 234. Command engine 232 retrieves and executes commands 240 stored in system memory 110. In response to receiving a state command, command engine 232 may be configured to set one or more state registers in GPU 112 to particular values based on the state command. In response to receiving a draw call command, command engine 232 may be configured to cause processing units 234 to render the geometry represented by vertices based on primitive type data stored in system memory 110. Command engine 232 may also receive shader program binding commands, and load particular shader programs into one or more of the programmable processing units 234 based on the shader program binding commands.

Processing units 234 may include one or more processing units, each of which may be a programmable processing unit or a fixed-function processing unit. A programmable processing unit may include, for example, a programmable shader unit that is configured to execute one or more shader programs downloaded onto GPU 112 from CPU 106. A shader program, in some examples, may be a compiled version of a program written in a high-level shading language, such as an OpenGL Shading Language (GLSL), a High Level Shading Language (HLSL), a C for Graphics (Cg) shading language, etc.

In some examples, a programmable shader unit may include a plurality of processing units that are configured to operate in parallel, e.g., an SIMD pipeline. A programmable shader unit may have a program memory that stores shader program instructions and an execution state register, e.g., a program counter register that indicates the current instruction in the program memory being executed or the next instruction to be fetched. The programmable shader units in processing units 234 may include, for example, vertex shader units, pixel shader units, geometry shader units, hull shader units, domain shader units, compute shader units, and/or unified shader units. The one or more processing units 234 may form a 3D graphics rendering pipeline, which may include one or more shader units that are configured to execute a shader program. Browser 224 may send different shader programs to GPU 112.

III. Render Content onto a Display Device

In an example, commands 240 include a command to render webpage 300. Processing units 234 includes a fragment shader or pixel shader 237 that may during the composition stage of the rendering process, composite at most one of LQ tile 270 and HQ tile 272 onto display 118. Pixel shader 237 may also compute and set colors for pixels covered by a texture object (e.g., texture image) displayed on display device 118. The terms "fragment" and "pixel" may be used interchangeably in the disclosure.

Each pixel of display device 118 may have associated information. In some examples, each pixel has three color channels and an alpha channel. A color channel is a function of a specific component of that pixel, which is typically a red, green, and blue (RGB) component. Accordingly, a pixel may have a red channel, green channel, blue channel, and alpha channel. The combination of these three colors at different intensities may represent a full range of the visible spectrum for each pixel. Additionally, the alpha channel may have an attribute indicating the degree of opacity of each pixel. When the attribute is examined in a compositing program, an attribute value of one (white) represents 100 percent opaqueness and entirely covers the pixel's area of interest. In contrast, an attribute value of zero (black) represents 100 percent transparency.

A. HQ Tile is Unavailable and LQ Tile is Available

In some embodiments, during the composition stage of the rendering process, GPU 112 may composite either LQ tile 270 or HQ tile 272 onto display device 118. LQ tiles are smaller and consume less memory space than their corresponding HQ tiles. LQ tile 270 may include content (e.g., graphics, text, images, icons, links for videos etc.) having a lower resolution than HQ tile 272. Accordingly, it may be quicker for GPU 112 to composite LQ tile 270 onto display device 118 instead of HQ tile 272 because LQ tile 270 contains less information than HQ tile 272.

As the user scrolls the webpage frame, new tiles may appear in the browser window and old tiles may disappear from the browser window. During fast scrolling, not all of the HQ tiles of a frame may be available. LQ tile 270 may be available before HQ tile 272 is available, for example, because it may be quicker to generate LQ tile 270 compared to HQ tile 272. Here, LQ tile 270 may be composited onto display device 118 to avoid the user seeing blank areas where the unavailable HQ tile would be displayed. Blank areas may be distracting and degrade overall user experience.

B. HQ Tile and LQ Tile are Available

Figure 4:
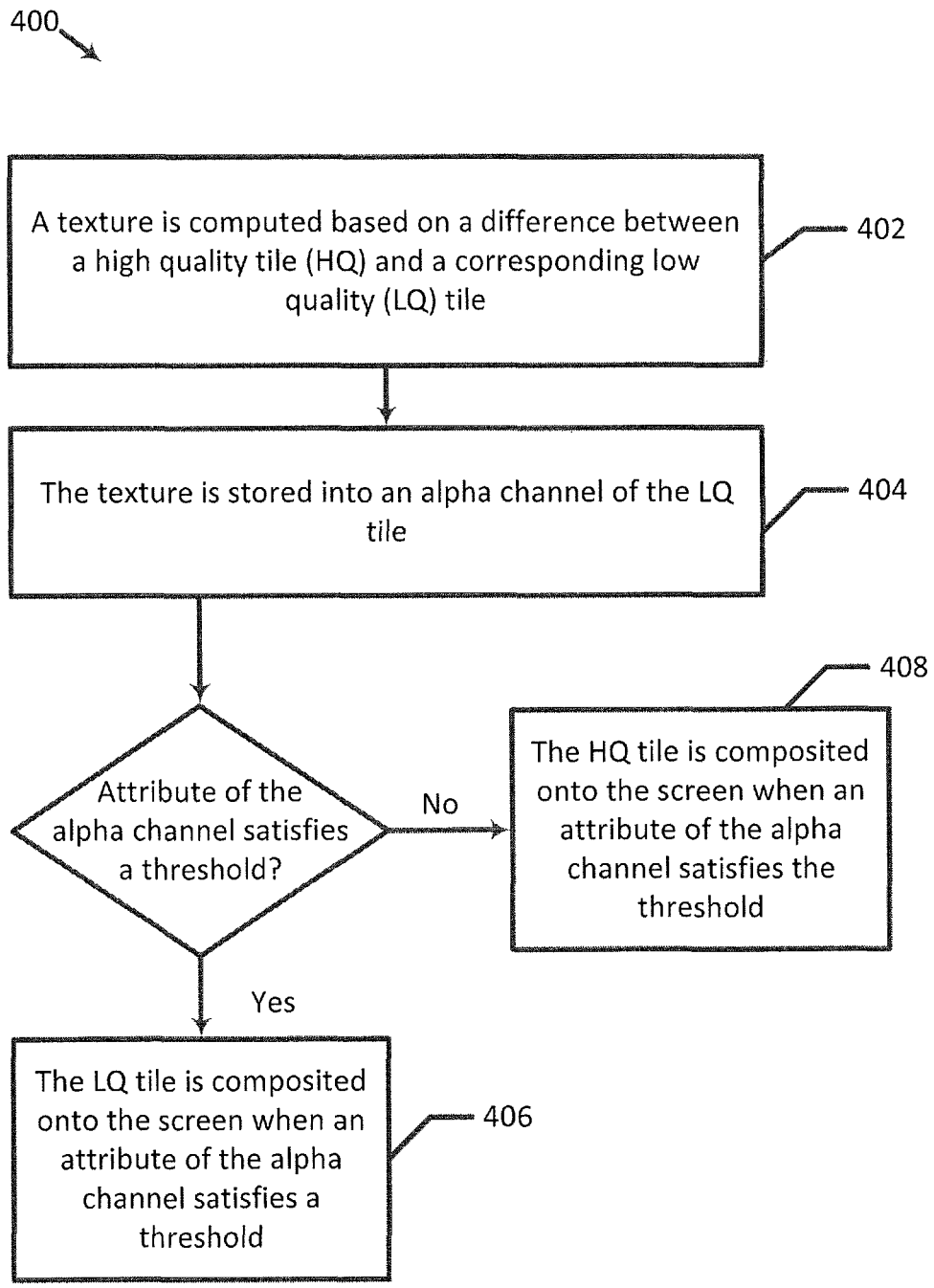
FIG. 4 is a flowchart of a process for the GPU to composite a HQ tile or a LQ tile onto a display device, according to some embodiments.

Alternatively, if both LQ tile 270 and HQ tile 272 are available, it may be desirable to composite LQ tile 270 onto display device 118 rather than HQ tile 272 (without replacing LQ tile 270 with HQ tile 272) if the LQ and HQ tiles are similar enough to each other such that it is unnoticeable or not distracting to the user to see the LQ tile. GPU 112 may determine whether to composite HQ tile 272 or LQ tile 270 onto display device 118. FIG. 4 is a flowchart 400 of a process for GPU 112 to composite HQ tile 272 or LQ tile 270 onto display device 118, according to some embodiments. Method 400 is not meant to be limiting and may be used in other applications.

1. Compute a Texture "$D_{LOW}$" Having the Same Resolution as the LQ Tile

In an action 402, a texture is computed based on a difference between HQ tile 272 and corresponding LQ tile 270. In an example, browser 224 sends instructions to GPU 112 to compute the texture $D_{LOW}$ via graphics API 226. GPU 112 compares the difference between two images (e.g., corresponding to HQ tile 272 and LQ tile 270) having different resolutions. In an example, pixel shader 237 determines the degree of similarity between HQ tile 272 and LQ tile 270 by computing a texture $D_{LOW}$ based on a difference between the tiles.

A pixel in LQ tile 270 may be referred to as an LQ pixel, and a pixel in HQ tile 272 may be referred to as an HQ pixel. The HQ and LQ tiles have a different number of pixels. Each LQ pixel in LQ tile 270 may be mapped to a plurality of HQ pixels in HQ tile 272. In an example, LQ tile 270 is a 32×32 pixel region that maps to a 512×512 pixel region in HQ tile 272. For each LQ pixel in LQ tile 270, the texture $D_{LOW}$ may include a difference value indicating the difference between the LQ pixel and its mapped plurality of HQ pixels in HQ tile 272. The texture $D_{LOW}$ has the same resolution as LQ tile 270. Each pixel in the texture $D_{LOW}$ may be associated with a single scalar value representing a difference between an LQ pixel and its mapped plurality of HQ pixels. GPU 112 may compute the texture $D_{LOW}$ efficiently because GPU 112 can process the pixels in parallel. In an example, each instance of pixel shader 237 may process one pixel of the browser window.

GPU 112 may calculate the texture $D_{LOW}$ in a variety of ways. In some examples, GPU 112 calculates the texture $D_{LOW}$ in one pass. In an example, for each LQ pixel in LQ tile 270, GPU 112 identifies a corresponding pixel region in HQ tile 272 (e.g., 16×16 HQ pixels). GPU 112 may compute an attribute of the pixel region. The attribute of the pixel region may be the average of the pixel region. In an example, the intensity of the pixel values in the pixel region are averaged out. Each pixel may include an RGB color. For example, each pixel may include three scalar values, where a first scalar value corresponds to the red ("R") value, a second scalar value corresponds to the green ("G") value, and a third scalar value corresponds to the blue "B" value. The pixel intensity may be a function of the three color values. In an example, the intensity is a linear combination of the red, green, and blue values. GPU 112 may then compute a difference between the attribute of the pixel region and the LQ pixel. The difference between the attribute of the pixel region and the LQ pixel may be a value in the texture $D_{LOW}$. In an example, the LQ pixel corresponds to a pixel in the texture $D_{LOW}$ storing the difference between the attribute of the pixel region and the LQ pixel. This difference may be computed for each LQ pixel in LQ tile 270, and the texture $D_{LOW}$ may include each of these computed differences.

In another example, for each LQ pixel in LQ tile 270, GPU 112 identifies a corresponding pixel region in HQ tile 272 and computes a difference between the LQ pixel and each pixel in the pixel region. GPU 112 may then compute an average of the one or more computed differences. The average may be a value in the texture $D_{LOW}$. In an example, the LQ pixel corresponds to a pixel in the texture $D_{LOW}$ storing the average. This average may be computed for each LQ pixel in LQ tile 270, and the texture $D_{LOW}$ may include each of these computed averages.

In some examples, GPU 112 calculates the texture $D_{LOw}$ in more than one pass. In an example, for each LQ pixel in LQ tile 270, GPU 112 identifies a corresponding pixel region in HQ tile 272 and computes a texture $D_{HIGH}$ based on a difference between the LQ pixel and the pixel region. The resolution of the texture $D_{HIGH}$ may be the same as HQ tile 272's resolution. Each pixel in the texture $D_{HIGH}$ may be associated with a single scalar value representing a difference in pixel intensity between HQ tile 272 and LQ tile 270. In a separate pass, GPU 112 may down-sample the texture $D_{HIGH}$ to the resolution of LQ tile 270. The texture $D_{am}$ may be the texture $D_{HIGH}$ down-sampled to the resolution of LQ tile 270. In an example, the LQ pixel corresponds to a pixel in the texture $D_{LOW}$ storing the down-sampled difference between the LQ pixel and the pixel region. The texture $D_{HIGH}$ may be stored in one or more temporary buffers and may be discarded after the texture $D_{LOW}$ is computed. This down-sampled difference may be computed for each LQ pixel in LQ tile 270, and the texture $D_{LOW}$ may include each of these down-sampled differences.

2. Store the Texture "$D_{LOW}$" into an Alpha Channel of the LQ Tile

In an action 404, the texture is stored into an alpha channel of the LQ tile. In an example, browser 224 sends instructions to GPU 112 to store the texture $D_{LOW}$ into an alpha channel of LQ tile 270. Accordingly, GPU 112 may store the texture $D_{LOW}$ into an alpha channel of LQ tile 270. Content of the texture $D_{LOW}$, which stores a single scalar value per pixel, may be written to the alpha channel of LQ tile 270. In particular, each LQ pixel in LQ tile 270 may have an alpha channel having an attribute that describes the degree of opacity of an object fragment for the LQ pixel. The attribute of the alpha channel typically has a value of one, indicating that the tile is opaque. Because tiles are typically opaque, the attribute of the alpha channel may be used to store information different from the opaqueness of the tile. For example, the attribute may indicate a similarity (or difference) between LQ tile 270 and HQ tile 272 to determine whether compositing LQ tile 270 is sufficient without compositing HQ tile 272 onto display device 118. The alpha channel may be used to store the texture $D_{LOW}$ to save memory space.

In some embodiments, each value in the texture $D_{LOW}$ is stored in an attribute of an alpha channel of an LQ pixel in LQ tile 270. The attribute is based on a difference between the LQ pixel and its mapped pixel region in HQ tile 272. Each difference value stored in the alpha channel of LQ tile 270 may be an average of multiple differences in HQ tile 272. A difference value provides an indication of whether to composite HQ tile 272 or LQ tile 270 onto display device 118. In an example, the difference value may be compared to a threshold to determine how similar LQ tile 270 is to HQ tile 272. The threshold may depend on various factors such as the resolution of the screen and webpage. For example, the threshold may indicate a particular percentage difference in pixel values (e.g., 20 percent difference in pixel intensity).

3. Difference Between the LQ and HQ Tiles Based on a Threshold

In an action 406, the LQ tile is composited onto the display device when an attribute of the alpha channel satisfies a threshold. Accordingly, color values from texels in LQ tile 270 may be used. In an example, browser 224 sends instructions to GPU 112 to read from the attribute of the alpha channel and compare the attribute to the threshold via graphics API 226. GPU 112 may composite LQ tile 270 onto display device 118 when an attribute of the alpha channel satisfies a threshold. The attribute of the alpha channel may satisfy the threshold if the attribute is less than (or equal to) the threshold, which may indicate how similar LQ tile 270 is to HQ tile 272. An attribute that is below the threshold may indicate that LQ tile 270 is similar enough to HQ tile 272 to not degrade the user's experience. Accordingly, LQ tile 270 may be composited onto display device 118 instead of HQ tile 272.

A webpage may contain low frequency data (e.g., blanks, constant color, or slow changing gradient or images) such that if LQ tile 270 is composited onto display device 118 rather than HQ tile 272, the end result is good enough for a user to view without degrading the user's experience. LQ tile 270 may be similar to HQ tile 272 if the HQ tile contains low frequency data.

GPU 112 may cache LQ tile 270 in GPU cache 114 for later retrieval. If GPU 112 accesses LQ tile 270, GPU 112 may retrieve LQ tile 270 from GPU cache 114 rather than accessing texture memory 264. Many of the browser window's pixels may (inversely) map to the same LQ tile. Accordingly, instances of pixel shader 237 may fetch the same LQ tile, which may be more likely to be in GPU 112's texture cache. This may result in lowered memory bandwidth for tiles containing pixels having similar color values between HQ bitmap 262 and LQ bitmap 260, as in the case where the web page contains blank areas, slow changing gradients, etc.

Additionally, it may be unnecessary for GPU 112 to access HQ tile 272 at all. Rather, GPU 112 may read the alpha channel of LQ tile 270 to determine whether the difference between LQ tile 270 and HQ tile 272 is so small that GPU 112 can composite LQ tile 272. If the attribute of the alpha channel satisfies the threshold, GPU 112 is saved from accessing HQ tile 272, thus reducing memory bandwidth.

In contrast, in an action 408 the HQ tile is composited onto the display device when the attribute of the alpha channel does not satisfy the threshold. Accordingly, color values from texels in HQ tile 272 may be used. GPU 112 may composite HQ tile 272 onto display device 118 when the attribute of the alpha channel does not satisfy the threshold. In an example, the attribute does not satisfy the threshold if the attribute is not less than the threshold (e.g., greater than or equal to the threshold). An attribute that is not below the threshold may indicate that LQ tile 270 is not similar enough to HQ tile 272 to be displayed instead of the HQ tile. Accordingly, HQ tile 272 may be composited onto display device 118 instead of LQ tile 270. A webpage may contain high frequency data such that if LQ tile 270 is composited onto display device 118 rather than HQ tile 272, the end result is distracting for a user to view.

GPU 112 may composite HQ tile 272 onto display device 118 in a variety of ways. In an example, GPU 112 accesses the high-resolution tile and copies texels from HQ tile 272 into a frame buffer for display on display device 118. In another example, LQ tile 270 may already be composited onto display device 118. In this example, GPU 112 may add back the difference between HQ tile 272 and LQ tile 270 to obtain HQ tile 272.

In some embodiments, actions 402-408 may be performed for any number of LQ tiles. It is also understood that additional actions may be performed before, during, or after actions 402-408 discussed above. It is also understood that one or more of the actions of method 400 described herein may be omitted, combined, or performed in a different sequence as desired.

Using techniques disclosed in the present disclosure, the number of texture fetches is not reduced, but may actually increase. For example, if the attribute of the alpha channel does not satisfy the threshold, GPU 112 accesses both LQ tile 270 and HQ tile 272. Despite this, embodiments of the disclosure may improve performance significantly by reducing the memory bandwidth if GPU 112 uses texels from LQ tiles often.

In some embodiments, a processing unit (e.g., GPU 112 and/or CPU 106) varies the threshold on-the-fly to reduce memory bandwidth. The processing unit may decrease the threshold so that LQ tiles may be used more often. In an example, during fast scroll, the user is less likely to notice the difference between LQ and HQ tiles. Accordingly, if the processing unit detects a fast scroll, the processing unit may decrease the threshold. In another example, computing device 102 may be in a low-battery mode (e.g., less than 15 percent battery left), and it may be desirable to reduce power consumption. Accordingly, if the processing unit detects that the computing device is in the low-battery mode, the processing unit may decrease the threshold.

As discussed above and further emphasized here, FIGS. 1-4 are merely examples, which should not unduly limit the scope of the claims. In various embodiments of the present disclosure, execution of instruction sequences (e.g., actions 402-408 in FIG. 4) to practice the present disclosure may be performed by computing device 102. In various other embodiments of the present disclosure, a plurality of computing devices may be coupled by a communications link to a network (e.g., such as a local area network (LAN), wireless local area network (WLAN), public switched telephone network (PTSN), and/or various other wired or wireless networks, including telecommunications, mobile, and cellular phone networks) may perform instruction sequences to practice the present disclosure in coordination with one another.

In an example, instructions for compositing a LQ tile or a HQ tile may be stored in a computer readable medium of system memory 110. Processors may execute the instructions to compute a texture $D_{LOW}$ based on a difference between a HQ tile and a corresponding LQ tile and to store the texture $D_{LOW}$ into an alpha channel of the LQ tile. Processors may also execute the instructions to composite the LQ tile onto display device 118 when an attribute of the alpha channel satisfies a threshold. Processors may also execute the instructions to composite the HQ tile onto display device 118 when the attribute of the alpha channel does not satisfy the threshold.

Where applicable, various embodiments provided by the present disclosure may be implemented using hardware, software, firmware, or combinations thereof. Also where applicable, the various hardware components, software components, and/or firmware components set forth herein may be combined into composite components including software, firmware, hardware, and/or all without departing from the spirit of the present disclosure. Where applicable, the various hardware components, software components, and/or firmware components set forth herein may be separated into sub-components including software, firmware, hardware, or all without departing from the spirit of the present disclosure. In addition, where applicable, it is contemplated that software components may be implemented as hardware components, and vice-versa. Where applicable, the ordering of various steps or actions described herein may be changed, combined into composite steps or actions, and/or separated into sub-steps or sub-actions to provide features described herein.

Although embodiments of the present disclosure have been described, these embodiments illustrate but do not limit the disclosure. It should also be understood that embodiments of the present disclosure should not be limited to these embodiments but that numerous modifications and variations may be made by one of ordinary skill in the art in accordance with the principles of the present disclosure and be included within the spirit and scope of the present disclosure as hereinafter claimed.

What is claimed is:

1. A method of displaying data on a display device, comprising:
   computing a difference between an average intensity of a plurality of pixels in a high quality (HQ) version of a first tile and an average intensity of one or more pixels in a corresponding low quality (LQ) version of the first tile, the first tile having an alpha channel;
   storing the difference into an attribute of the alpha channel; and
   compositing the LQ version of the first tile onto the display device when the attribute of the alpha channel satisfies a threshold.

2. The method of claim 1, further including:
   compositing the HQ version of the first tile onto the display device when the attribute of the alpha channel does not satisfy the threshold.

3. The method of claim 2, wherein each LQ pixel in the LQ version of the first tile has an alpha channel.

4. The method of claim 2, further including:
   computing a first texture based on the difference;
   computing a second texture based on a difference between the plurality of pixels in the HQ version of the first tile and the one or more pixels in the LQ version of the first tile, each pixel in the second texture having a single scalar value representing a difference in pixel intensity between the HQ version of the first tile and the corresponding LQ version of the first tile; and
   down-sampling the second texture to a resolution of the LQ version of the first tile, wherein the computed first texture is the down-sampled second texture.

5. The method of claim 4, wherein the second texture has a same resolution as the HQ version of the first tile.

6. The method of claim 2, wherein each pixel in the LQ version of the first tile has a plurality of color channels and an alpha channel, the computer-executable instructions for performing operations further including:
   computing a first texture based on the difference, the first texture including a single scalar value per pixel in the LQ version of the first tile.

7. The method of claim 6, wherein each single scalar value of the first texture represents a difference between the plurality of pixels in the HQ version of the first tile and the one or more pixels in the LQ version of the first tile.

8. The method of claim 1, wherein the computing a difference includes computing an average of differences between the plurality of pixels in the HQ version of the first tile and the one or more pixels in the LQ version of the first tile.

9. The method of claim 1, wherein the LQ version of the first tile is a lower resolution version of the HQ version of the first tile.

10. A system for displaying data on a display device, comprising:
   a display device;
   a memory; and
   one or more processors coupled to the memory and display device, wherein the one or more processors is configured to:
      compute an average of differences between a plurality of pixels in a high quality (HQ) version of a first tile and one or more pixels in a corresponding low quality (LQ) version of the first tile, the first tile having an alpha channel;
      store the difference into an attribute of the alpha; and
      composite the LQ version of the first tile onto the display device when the attribute of the alpha channel satisfies a threshold.

11. The system of claim 10, wherein the one or more processors are configured to composite the HQ version of the first tile onto the display device when the attribute of the alpha channel does not satisfy the threshold.

12. The system of claim 11, wherein the one or more processors are configured to compute a first texture based on the average of differences, and compute a second texture based on a difference between the plurality of pixels in the HQ version of the first tile and the one or more pixels in the corresponding LQ version of the first tile.

13. The system of claim 12, wherein each pixel in the second texture has a single scalar value representing a difference in pixel intensity between the HQ version of the first tile and the LQ version of the first tile, and the second texture has a same resolution as the HQ version of the first tile.

14. The system of claim 12, wherein the one or more processors are configured to down-sample the second texture to a resolution of the LQ version of the first tile, and wherein the computed first texture is the down-sampled second texture.

15. The system of claim 10, wherein the LQ version of the first tile is a lower resolution version of the HQ version of the first tile.

16. The system of claim 10, wherein each pixel in the LQ version of the first tile has an alpha channel.

17. The system of claim 16, wherein the one or more processors are configured to compute a difference between an average intensity of the plurality of pixels in the HQ version of the first tile and an average intensity of the one or more pixels in the LQ version of the first tile.

18. A non-transitory computer-readable medium having stored thereon computer-executable instructions for performing operations, comprising:
   computing an average of differences between a plurality of pixels in a high quality (HQ) version of a first tile and one or more pixels in a corresponding low quality (LQ) version of the first tile, the first tile having an alpha channel;
   storing the difference into an attribute of the alpha channel; and
   compositing the LQ version of the first tile onto the display device when the attribute of the alpha channel satisfies a threshold.

19. The non-transitory computer-readable medium of claim 18, wherein the computer-executable instructions for performing operations further include:
   compositing the HQ version of the first tile onto the display device when the attribute of the alpha channel does not satisfy the threshold.

20. The non-transitory computer-readable medium of claim 18, the computer-executable instructions for performing operations further comprising:
   compositing the HQ version of the first tile onto the display device when the attribute of the alpha channel does not satisfy the threshold.

* * * * *